US008563792B2

(12) United States Patent
Aves et al.

(10) Patent No.: US 8,563,792 B2
(45) Date of Patent: Oct. 22, 2013

(54) SYSTEMS AND METHODS OF GENERATING RENEWABLE DIESEL

(75) Inventors: Richard Aves, Carlsbad, NM (US); Jason Smith, Lexington, KY (US)

(73) Assignee: Cetane Energy, LLC, Carlsbad, NM (US)

( * ) Notice: Subject to any disclaimer, the term of this patent is extended or adjusted under 35 U.S.C. 154(b) by 735 days.

(21) Appl. No.: 12/639,654

(22) Filed: Dec. 16, 2009

(65) Prior Publication Data

US 2010/0155296 A1    Jun. 24, 2010

Related U.S. Application Data

(60) Provisional application No. 61/138,025, filed on Dec. 16, 2008.

(51) Int. Cl.
C07C 1/00 (2006.01)

(52) U.S. Cl.
USPC .............. 585/240; 585/241; 585/242; 44/606

(58) Field of Classification Search
USPC ............................ 585/240, 241, 242; 44/606
See application file for complete search history.

(56) References Cited

U.S. PATENT DOCUMENTS

| 4,419,220 A | 12/1983 | Lapierre et al. |
| 4,534,855 A | 8/1985 | Silverman |
| 5,183,556 A | 2/1993 | Reilly et al. |
| 5,502,077 A | 3/1996 | Breivik et al. |
| 5,705,722 A | 1/1998 | Monnier et al. |
| 5,814,109 A | 9/1998 | Cook et al. |
| 5,942,203 A | 8/1999 | Van Dijk et al. |
| 6,093,309 A | 7/2000 | Seamans et al. |
| 6,488,727 B2 | 12/2002 | Naegeli et al. |
| 7,232,935 B2 | 6/2007 | Jakkula et al. |
| 7,279,018 B2 | 10/2007 | Jakkula et al. |
| 7,872,165 B2 * | 1/2011 | Bertoncini et al. ........... 585/240 |
| 7,880,043 B2 * | 2/2011 | Chapus et al. ................ 585/240 |
| 7,955,401 B2 | 6/2011 | Ghonasgi et al. |
| 7,982,075 B2 * | 7/2011 | Marker et al. ................ 585/240 |
| 8,022,259 B2 * | 9/2011 | Bauer et al. .................. 585/240 |
| 8,026,401 B2 * | 9/2011 | Abhari et al. ................ 585/240 |

(Continued)

FOREIGN PATENT DOCUMENTS

| SE | 9700149 | 8/1997 |
| WO | 99/065825 | 12/1999 |
| WO | 01/49812 | 12/2007 |

OTHER PUBLICATIONS

Office Action dated Oct. 22, 2012, issued in Canadian Application No. 2,746,879.

(Continued)

Primary Examiner — Nina Bhat
(74) Attorney, Agent, or Firm — Fox Rothschild LLP

(57) ABSTRACT

A method of manufacturing a purified renewable diesel product from a biofeedstock includes filtering the biofeedstock, heating the biofeedstock to about 520° F., introducing hydrogen into the biofeedstock, and treating the biofeedstock in a reactor to generate a renewable diesel product. Additionally, the method includes cooling the renewable diesel product wherein the renewable diesel product comprises a liquid, separating vapors from the liquid, and distilling the liquid in a distillation column to generate the purified renewable diesel product. In at least one embodiment the biofeedstock comprises at least one of waste grease, tallow, algae, algal oil, vegetable oil, and soybean oil.

32 Claims, 8 Drawing Sheets

(56) References Cited

U.S. PATENT DOCUMENTS

| | | | |
|---|---|---|---|
| 8,067,657 B2 * | 11/2011 | Duarte Santiago et al. | .. 585/733 |
| 8,187,344 B2 | 5/2012 | Jakkula et al. | |
| 2004/0074759 A1 | 4/2004 | Purta et al. | |
| 2005/0241992 A1 | 11/2005 | Lott et al. | |
| 2007/0048848 A1 | 3/2007 | Sears | |
| 2007/0137097 A1 | 6/2007 | Ikura | |
| 2007/0170091 A1 | 7/2007 | Monnier et al. | |
| 2007/0260102 A1 | 11/2007 | Santiago et al. | |
| 2008/0154073 A1 | 6/2008 | Petri et al. | |
| 2008/0160593 A1 | 7/2008 | Oyler | |
| 2008/0161614 A1 | 7/2008 | Bertoncini et al. | |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0182298 A1 | 7/2008 | Day | |
| 2008/0282606 A1 | 11/2008 | Plaza et al. | |
| 2009/0082603 A1 | 3/2009 | Kalnes et al. | |
| 2009/0287029 A1 | 11/2009 | Anumakonda et al. | |
| 2009/0299112 A1 | 12/2009 | Bauer et al. | |

OTHER PUBLICATIONS

International Search Report dated Mar. 23, 2010, issued in Application PCT/US2009/068292.

Written Opinion dated Mar. 23, 2010, issued in Application PCT/US2009/068292.

* cited by examiner

SYSTEMS AND METHODS OF GENERATING RENEWABLE DIESEL

CROSS REFERENCE TO RELATED APPLICATION

The present application claims the benefit of U.S. Provisional Patent Application No. 61/138,025 filed on Dec. 16, 2008, the content of which is incorporated herein by reference in its entirety for all purposes.

FIELD

This invention relates, in general, to systems and processes for generating renewable diesel, including at least one method of generating renewable diesel from one or more of waste greases, tallow, vegetable oil, soy oil, algae and algal oil.

BACKGROUND

Diesel fuel produced from crude oil at petroleum refineries naturally contains almost no oxygen. However, petroleum diesel does naturally contain large amounts of sulfur. Diesel produced from typical crude oils may contain anywhere from 5000 ppm to 20,000 ppm of sulfur. The on-road specification for sulfur in diesel fuel, set by the EPA, is 15 ppm. To remove the excess sulfur in the diesel fuel, refineries use a process known as hydrotreating or hydrodesulfurization, whereby, the diesel fuel is mixed with hydrogen in the presence of a catalyst to chemically remove the sulfur. The by-product of this reaction is hydrogen sulfide ($H_2S$). Most refineries achieve sulfur levels as low as 6-8 ppm.

One of the benefits of using waste greases and tallow to create a fuel is that it naturally contains almost no sulfur, and it has been shown to lower emissions from vehicles. Waste greases and tallow are also alternative fuel sources that may lower the United States dependence of foreign oil and boost the U.S. economy. The U.S. government is interested in further development of bio-fuels for these reasons. The U.S. government has mandated that up to a billion gallons of renewable diesel must be used annually by the year 2012. The State of New Mexico has also passed a mandate that all diesel fuel sold contain 5% renewable diesel blended by 2012.

Fuel producers face several challenges in working to achieve these bio-fuel blends. For example, certain forms of renewable diesel do not meet some of the ASTM (American Society for Testing and Materials) specifications as required by the EPA for on-road diesel. The primary specifications of concern are related to the cold flow properties such as pour point and cloud point. These are the temperatures at which the diesel fuel becomes thick and limits its ability to pour or the temperature at which it begins to become "cloudy." If a fuel has a high cloud point or pour point, then it will likely gel and plug a fuel filter in cold weather. Biodiesel also falls short of meeting the required specifications in thermal-oxidation stability. The effects of low thermal-oxidation stability are that the fuel will break down as it is heated up or simply oxidize in the presence of air. This will lead to particulate or gum formation, and leave carbon deposits in engines. Fuels with low thermal-oxidation stability also have lower energy values and can lead to poor combustion. For these reasons, it is necessary to improve the quality of bio-fuels so that they can be better integrated into everyday use in the United States.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

The one or more present inventions relate, in general, to systems and processes for generating renewable diesel, including at least one method of generating renewable diesel from one or more of waste greases, tallow, vegetable oil, soy oil, algae and algal oil (hereafter referred to as "biofeedstock" or "feedstock"). The process uses a catalyst to chemically react the biofeedstocks in the presence of hydrogen to remove the oxygen from the molecules. The products of this process are water, carbon dioxide, and diesel fuel. The oxygen molecules in the biofeedstock are what lead to the poor thermal-oxidative stability. Accordingly, with those molecules then removed, the result is a clean burning, high energy, highly stable fuel. This will allow fuel sellers to meet the anticipated bio-fuel blending requirements.

In at least one embodiment, a method of manufacturing a purified diesel product from a biofeedstock is provided, the method comprising:
  filtering the biofeedstock;
  heating the biofeedstock;
  introducing hydrogen into the biofeedstock;
  treating the biofeedstock in a reactor to generate a diesel product, the reactor including a hydrotreating catalyst comprising, wherein the treating includes injecting hydrogen into the reactor at multiple locations to cool the diesel product within the reactor;
  cooling the diesel product wherein the diesel product comprises a liquid;
  separating vapors from the liquid; and
  distilling the liquid in a distillation column to generate the purified diesel product.

In at least one embodiment the method further comprises injecting a sulfiding agent into the feedstock after heating the biofeedstock. In at least one embodiment the hydrotreating catalyst comprises an alumina support structure with molybdenum attached to the alumina support structure. In at least one embodiment the heating raises the temperature of the biofeedstock to between about 500 to 540° F. In at least one embodiment the heating raises the temperature of the biofeedstock to about 520° F. In at least one embodiment the biofeedstock includes at least one of waste grease, tallow, algae, soy oil and vegetable oil.

Methods described herein include use of hydrogen in the reactor to cool the reactor. Accordingly, in at least one embodiment a method of manufacturing is provided, comprising:
  heating a biofeedstock;
  introducing hydrogen into the biofeedstock after said heating the biofeedstock;
  treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, and wherein 331 pounds of topping material, 700 pounds of ring catalyst, and 4800 pounds of 1/10 inch quadrolobe catalyst are associated with the reactor, and wherein additional hydrogen is injected into the reactor to cool the diesel product within the reactor;
  cooling the diesel product after said treating, the cooling causing a separation of gases from the diesel product, wherein the diesel product comprises a liquid; and
  distilling the liquid in a distillation column to generate a purified diesel product.

In at least one embodiment the separation of gases generates hydrogen that is recycled back to the reactor. In at least one embodiment the method further comprises cooling the purified diesel product through a heat exchanger that comprises a conduit containing an unreacted biofeedstock. In at least one embodiment the hydrogen that is injected into the reactor is injected at a plurality of locations along the reactor. In at least one embodiment after said distilling, then repeating said heating, and wherein at least a portion of the biofeedstock in said repeating said heating comprises an undistilled liquid previously separated from the diesel product before said distilling. In at least one embodiment the undistilled liquid is stored in a storage tank before said repeating said heating.

In addition to the methods noted above, embodiments of the one or more present inventions include systems for making a diesel product. Accordingly, in at least one embodiment a system for manufacturing a diesel product from a biofeedstock is provided, the system comprising:

means for heating the biofeedstock;
means for introducing hydrogen into the biofeedstock downstream of said means for heating;
a reactor vessel located downstream of said means for introducing hydrogen into the biofeedstock, the reactor vessel including a hydrotreating catalyst for contacting the biofeedstock within the reactor vessel to form the diesel product, wherein the hydrotreating catalyst is comprised of an alumina support structure with molybdenum attached to the alumina support structure;
means for injecting hydrogen into the reactor vessel to cool the reactor vessel; and
means for distilling the diesel product.

In at least one embodiment the system further comprises a storage tank for holding the diesel product and a pump to convey the diesel product to the means for heating the biofeedstock. In at least one embodiment the system further comprises a heat exchanger located downstream of the means for distilling the diesel product, the heat exchanger comprising a conduit for holding biofeedstock from a biofeedstock storage tank.

Systems described herein include use of hydrogen in the reactor to cool the reactor. Accordingly, in at least one embodiment a system for manufacturing a diesel product from a biofeedstock is provided, the system comprising:

a biofeedstock heater to heat the biofeedstock;
a hydrogen-adding conduit located downstream of the biofeedstock heater;
a reactor vessel including a hydrotreating catalyst for contacting the biofeedstock within the reactor vessel to form the diesel product, wherein the hydrotreating catalyst is comprised of an alumina support structure with molybdenum attached to the alumina support structure, and wherein the reactor vessel includes a plurality of hydrogen quench injection ports to cool the reactor vessel; and
a distillation column to purify the diesel product.

It is a further aspect of the one or more present inventions that a system may use different elements that provide the same function. Accordingly, a system for manufacturing a purified diesel product from a biofeedstock is provided, the system comprising:

means for filtering the biofeedstock;
means for heating the biofeedstock;
means for introducing hydrogen into the biofeedstock;
means for treating the biofeedstock to generate a diesel product, the means for treating including a hydrotreating catalyst and a means for injecting hydrogen as a coolant, wherein the hydrotreating catalyst is comprised of an alumina support structure with molybdenum attached to the alumina support structure;
means for cooling the diesel product wherein the diesel product comprises a liquid;
means for separating vapors from the liquid; and
means for distilling the liquid to generate the purified diesel product.

In at least one embodiment the system further comprises means for injecting a sulfiding agent into the feedstock after heating the biofeedstock. In at least one embodiment the means for treating the biofeedstock to generate a diesel product comprises a reactor vessel. In at least one embodiment the means for injecting hydrogen as a coolant comprises a plurality of hydrogen injection ports along the reactor vessel.

One or more methods associated with the present invention have applicability to relatively small biofeedstock processing facilities, such as facilities producing about 200 bpd of diesel product. Accordingly, a method of manufacturing approximately 200 bpd of a diesel product from a biofeedstock is provided, the method comprising:

heating the biofeedstock;
introducing hydrogen into the biofeedstock after heating the biofeedstock;
treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, wherein the reactor contains 331 pounds of a 5/8 inch sized topping material, and wherein additional hydrogen is injected into the reactor to cool the diesel product within the reactor;
cooling the diesel product after said treating, the cooling causing a separation of gases from the diesel product, wherein the diesel product comprises a liquid; and
distilling the liquid in a distillation column to generate a purified diesel product.

In accordance with at least one embodiment the reactor further contains 700 pounds of a 3/16 inch sized ring catalyst and 4800 pounds of a 1/10 inch sized quadrolobe catalyst. In accordance with at least one embodiment the 1/10 inch sized quadrolobe is made of straight molybdenum.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

As used herein, "downstream" means in the general direction of fluid flow beyond the point of reference, and "upstream" means the direction from which fluid is originating and before the point of reference.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and is understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the present invention, a more particular description of the invention is rendered by reference to specific embodiments thereof which are illustrated in the appended drawings. It is appreciated that these drawings depict only typical embodiments of the invention and are therefore not to be considered limiting of its scope. The invention is described and explained with additional specificity and detail through the use of the accompanying drawings in which.

DETAILED DESCRIPTION

An embodiment of the one or more present inventions includes a process of generating renewable hydrocarbon diesel fuel by removing oxygen components in biofeedstock sources. This method modifies the material's chemical structure so that it is usable at least in combination with on-road diesel fuel produced in petroleum refineries.

Figure 1A:
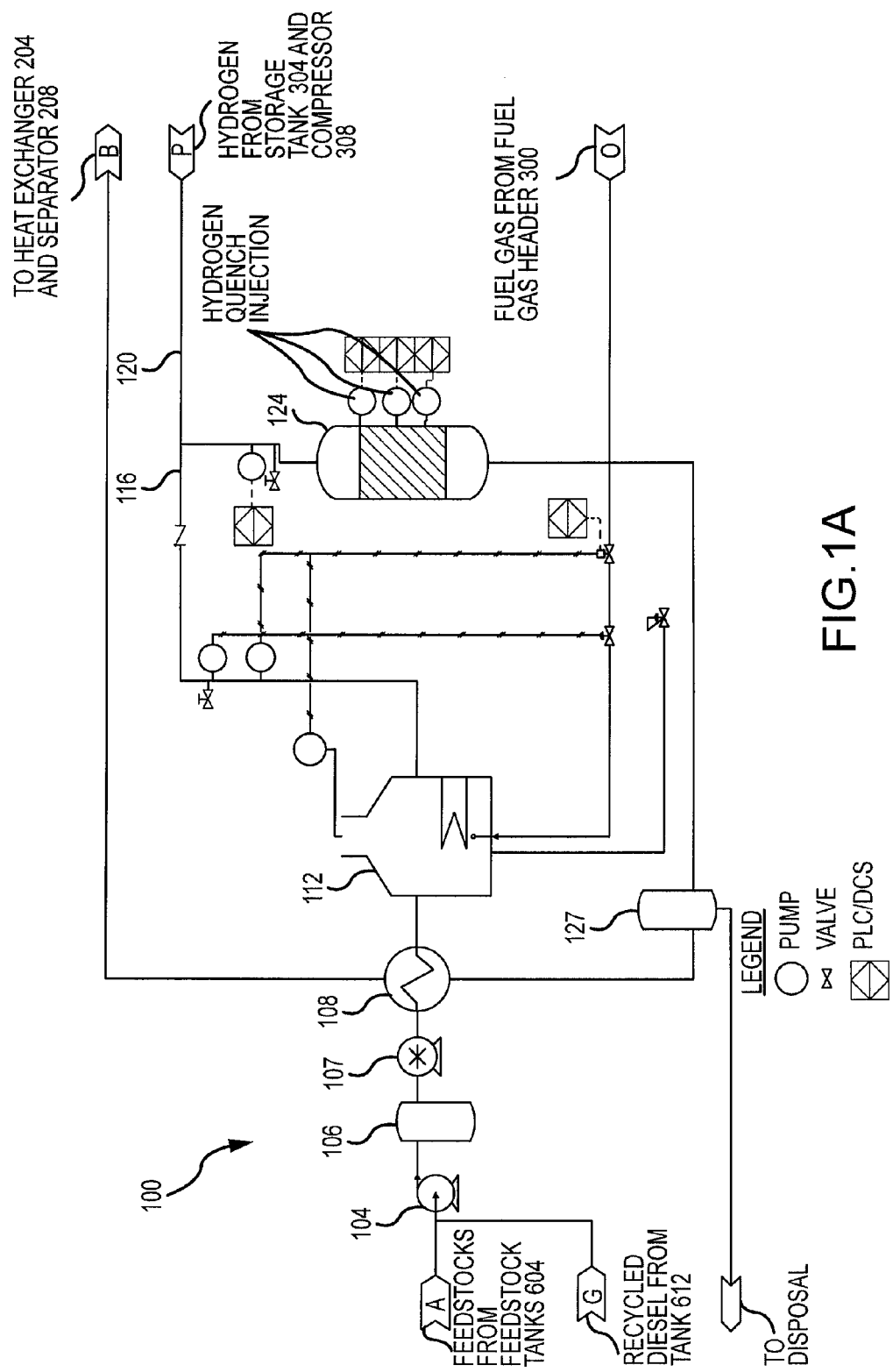
FIG. 1A illustrates a portion of a schematic of the deoxygenation process system of at least one embodiment of the one or more present inventions.
Figure 6:
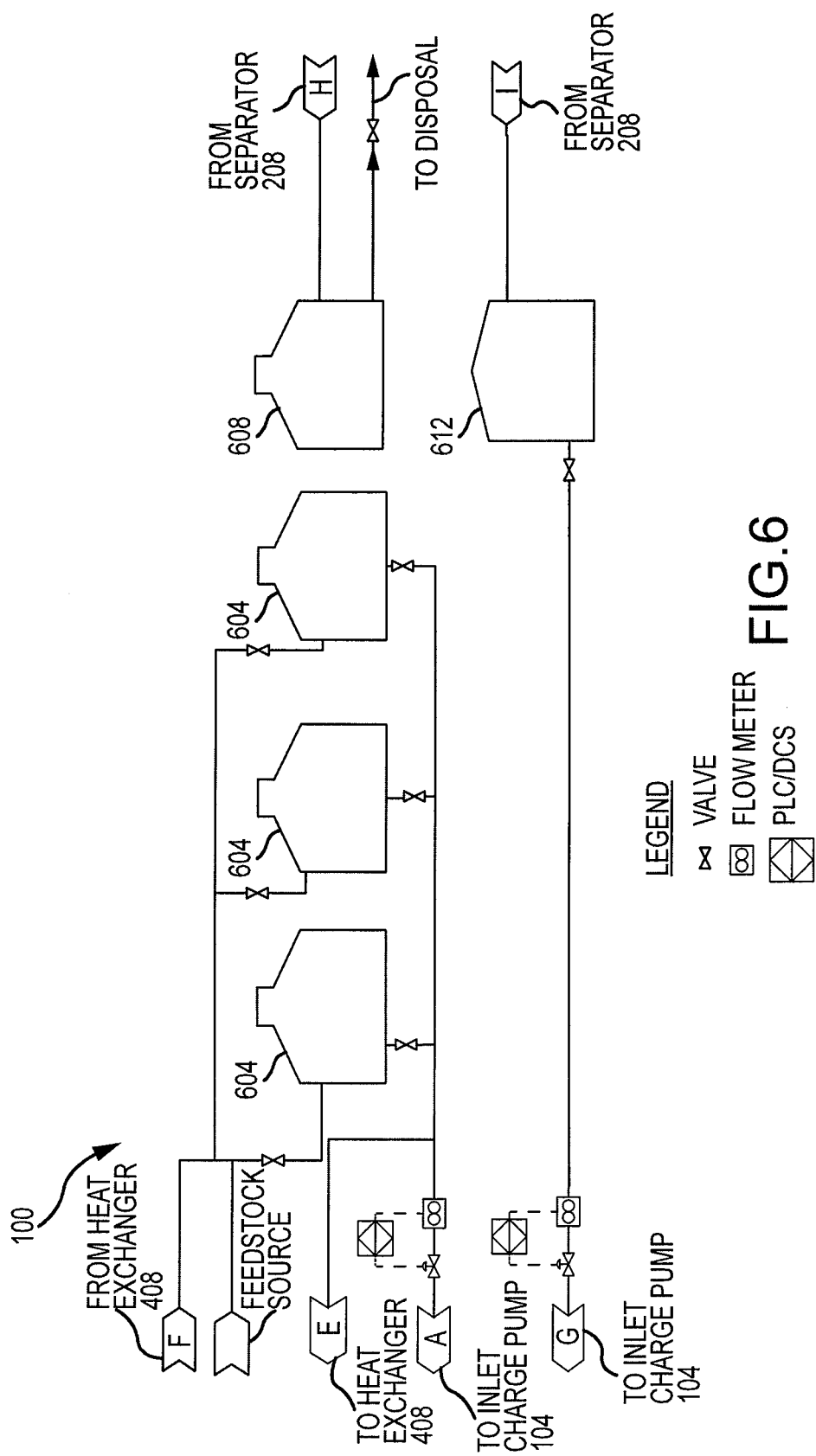
FIG. 6 illustrates an additional portion of the schematic illustrated in FIG. 1A or 1B.

With reference now to FIGS. 1A-6, and in accordance with at least one embodiment, a renewable diesel production system 100 is illustrated. As best seen in FIG. 6, biofeedstock is obtained and delivered to a renewable diesel production facility, such as by way of tanker trucks, railcars, or other vehicles or conveyance systems, and is then transferred into one or more feedstock tanks 604. As seen in FIG. 1A, an exemplary renewable diesel production system 100 includes an inlet charge pump 104 to pump the biofeedstock from the feedstock storage tanks 604 through a coalescing filter 106 to remove any particulates and water that may be entrained in the biofeedstock. The filtering process protects the downstream equipment from corrosion and helps to prevent catalyst deactivity. After flowing through the coalescing filter 106 the biofeedstock is then pumped by feed pump 107.

The feedstock then flows through one or more (e.g., a series) of heat exchangers 108 that heat the feedstock to about 200-300° F. in order to pre-heat the feedstock. In at least one embodiment, a gas-fired or electric inlet feed heater 112 is then used to further heat the feedstock to approximately 520° F. before being conveyed downstream. In accordance with at least one embodiment, although an electric heater may be used, if a gas-fired heater inlet feed heater 112 is used, it may utilize a mixture of system-produced gases including methane, ethane and propane, as well as purchased natural gas as its fuel source, wherein the produced gases of methane, ethane and propane are a by-product of the renewable diesel generation process described herein and explained further below.

After being heated to approximately 520° F., the feedstock is mixed with hydrogen gas. Here, hydrogen in introduced into the heated feedstock stream, such as via a pipe and injection valve assembly. The hydrogen is supplied by a liquid hydrogen tank 304. The hydrogen vaporizes as it exits the hydrogen tank 304, and is then compressed by compressor 308 to achieve the necessary pressure of about 650 psig for the reactors 124. The combined feedstock from feedline 116 and hydrogen from hydrogen line 120 enters reactor 124, which, in one embodiment, is a vessel large enough to hold the appropriate amount of catalyst. The reactor is loaded with ⅝ inch-sized topping material, 3/16 inch-sized ring catalyst, and 1/10 inch-sized quadrolobe catalyst. More particularly, and by way of example, the catalyst used in reactor 124 for a 200 bpd facility comprises an alumina support structure with straight molybdenum attached to that structure and is loaded with 331 pounds of topping material, 700 pounds of ring catalyst, and 4800 pounds of quadrolobe catalyst. The ring catalyst and quadrolobe catalyst are made from straight molybdenum. The active sites on the catalyst contain a sulfur molecule, which can be stripped off in the reaction process. This sulfur molecule is necessary to maintain the activity of the catalyst. Therefore, a sulfiding agent must be injected to the feedstock going into the reactor 124 in order to maintain the sulfur on the catalyst. In at least one embodiment, the sulfiding agent comprises di-t-butyl-polysulfide (DBPS) which is injected at about 100 ppm of the feed rate. In the reactor 124, the DBPS converts to $H_2S$. The resulting gases that are produced in this process contain up to 0.4 wt % H2S.

The reaction that takes place within the reactor 124 is an exothermic reaction. Therefore, a temperature increase results as the product goes through the reactor 124. If the temperature gets too high, then thermal cracking will begin to occur in the product, which means that the molecules are breaking down, resulting in the deposition of carbon deposits or "coke" on the catalyst. This coke will eventually plug the reactor 124 and stop the flow of the product through it, and it will deactivate the catalyst sufficiently to prevent the desired reaction from occurring. Accordingly, to control this temperature, a hydrogen quench is provided, which is an injection of cold hydrogen at various stages in the reactor 124. The hydrogen injection assembly is in fluid communication with a source of hydrogen and serves to regulate the flow and pressure of hydrogen input. Included in the hydrogen injection assembly may be one or more valves, pipes, fittings, or connectors. The hydrogen flow is adjusted in the proper amounts to the different stages to maintain the temperature at about 520° F.

Reacted diesel from diesel recycle tank 612 is also recycled through inlet feed pump 104 and charge pump 107 to limit the exothermic reaction occurring within the reactor 124 by controlling the build-up of heat within the reactor 124.

Figure 1B:
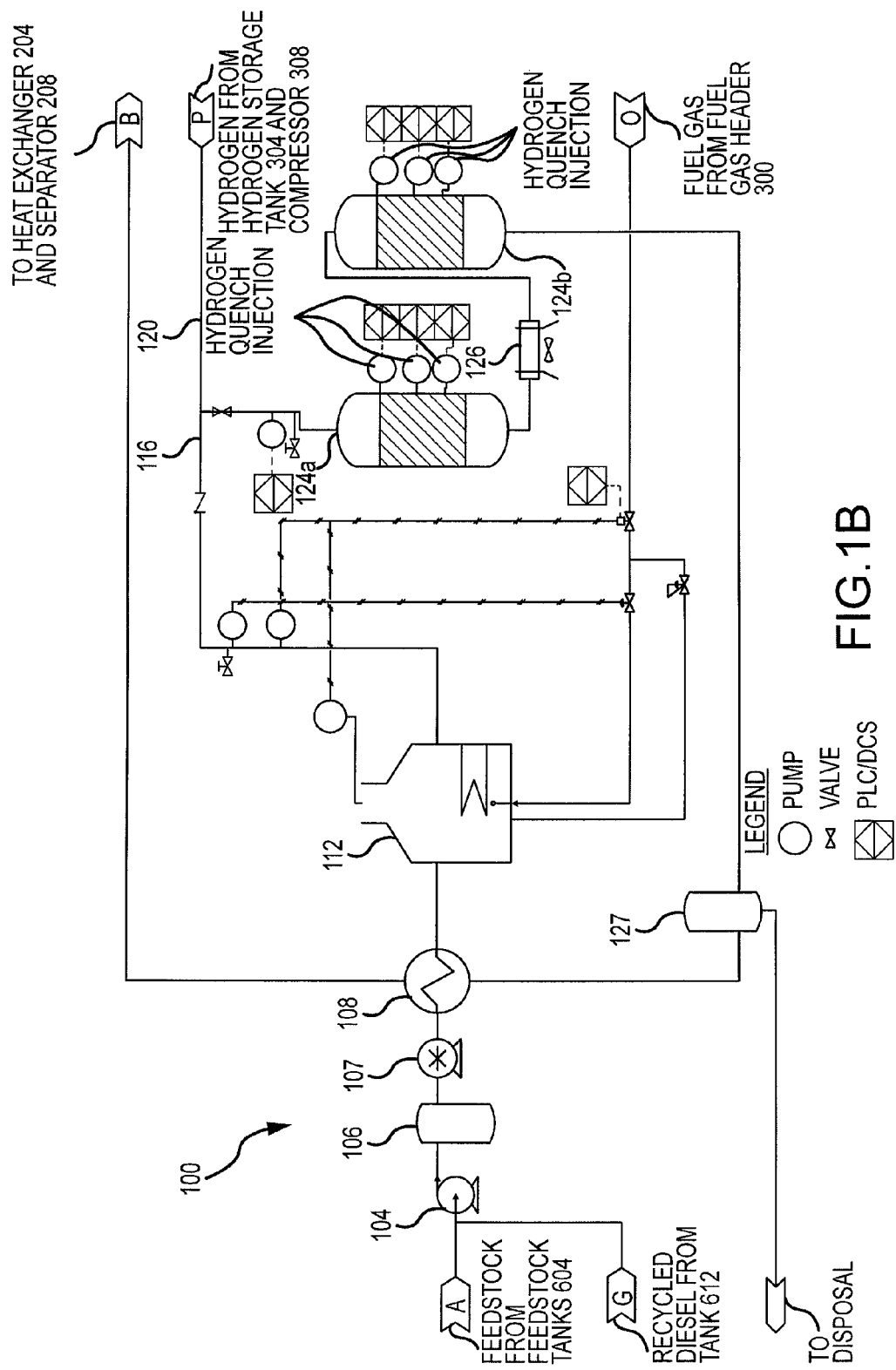
FIG. 1B illustrates an alternative to the portion of the schematic shown in FIG. 1A using multiple reactors.

With reference to FIG. 1B, in an alternative embodiment, one or more heat exchangers 126 are used between a plurality of relatively small reactors, such as reactors 124a and 124b, to dissipate the heat from the reaction. A cooler 126 may optionally be used between the reactors 124a and 124b. As those skilled in the art will appreciate, although two reactors 124a and 124b are shown in FIG. 1B, any number of appropriately sized reactors 124 may be used.

Figure 2:
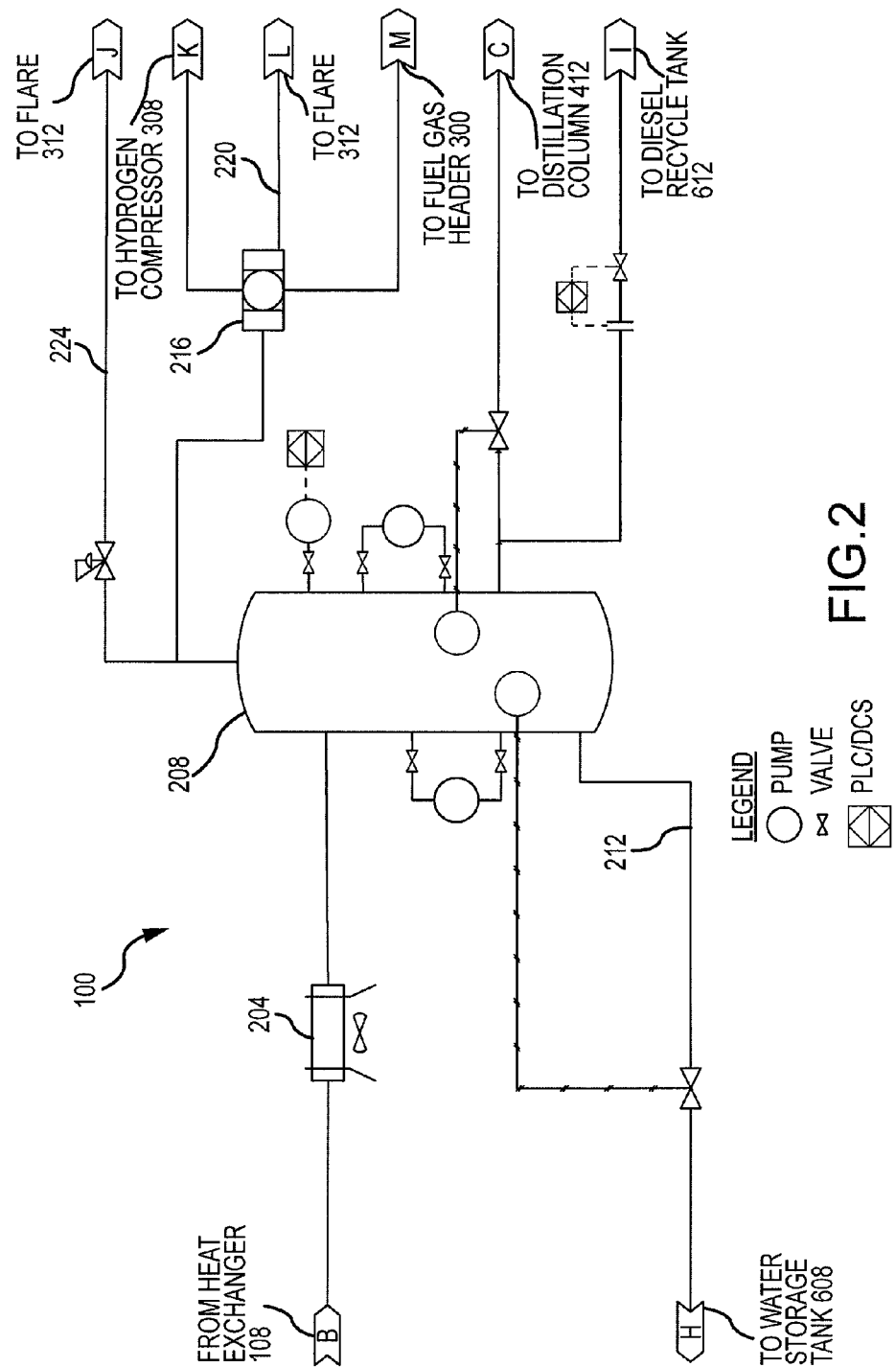
FIG. 2 illustrates an additional portion of the schematic illustrated in FIG. 1A or 1B.

Still referring to FIGS. 1A-1B and 2, following the reactor 124, the product is flowed through separator 127 to remove contaminants and heavy waxes from the product. Following the separator 127, the product is cooled through heat exchangers 108 and/or 204 before entering a separator vessel 208. In at least one embodiment, the separator vessel 208 is a horizontal drum that allows vapors to separate from liquids. The separator vessel 208 operates at 600 psig and 120° F. to also aid in the removal of the water that was produced in the reactor 124 from the product. This water is sent via conveyance line 212 to water storage tank 608 for future use, treatment and/or disposal.

Figure 3:
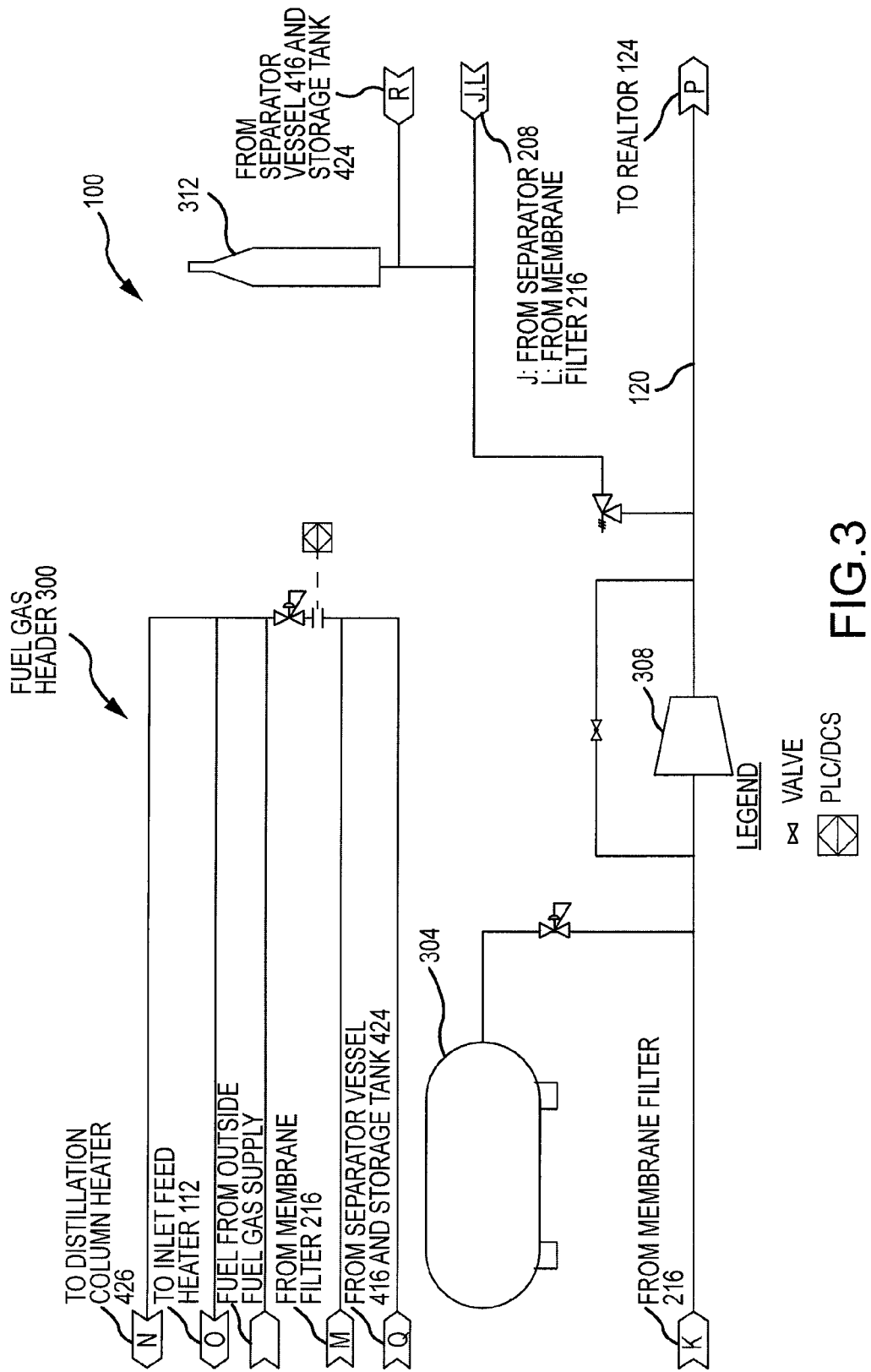
FIG. 3 illustrates an additional portion of the schematic illustrated in FIG. 1A or 1B.

With reference to FIGS. 2 and 3, in at least one embodiment the vapors taken off of the separator 208 are sent through a membrane filter 216 to separate the un-reacted hydrogen from the other gases. At least some of the rejected gases are used as fuel gas and the hydrogen permeate from the membrane filter 216 is recycled back to the hydrogen compressor 308 for reuse. In addition, portions of the gases filtered by the membrane filter 216 may be conveyed to an atmospheric flare 312 by flare line 220 where the gases will be ignited and burned. The atmospheric flare 312 may also burn gases transmitted by flare header line 224 that transmits gases from the separator 208 to the atmospheric flare 312.

Figure 4:
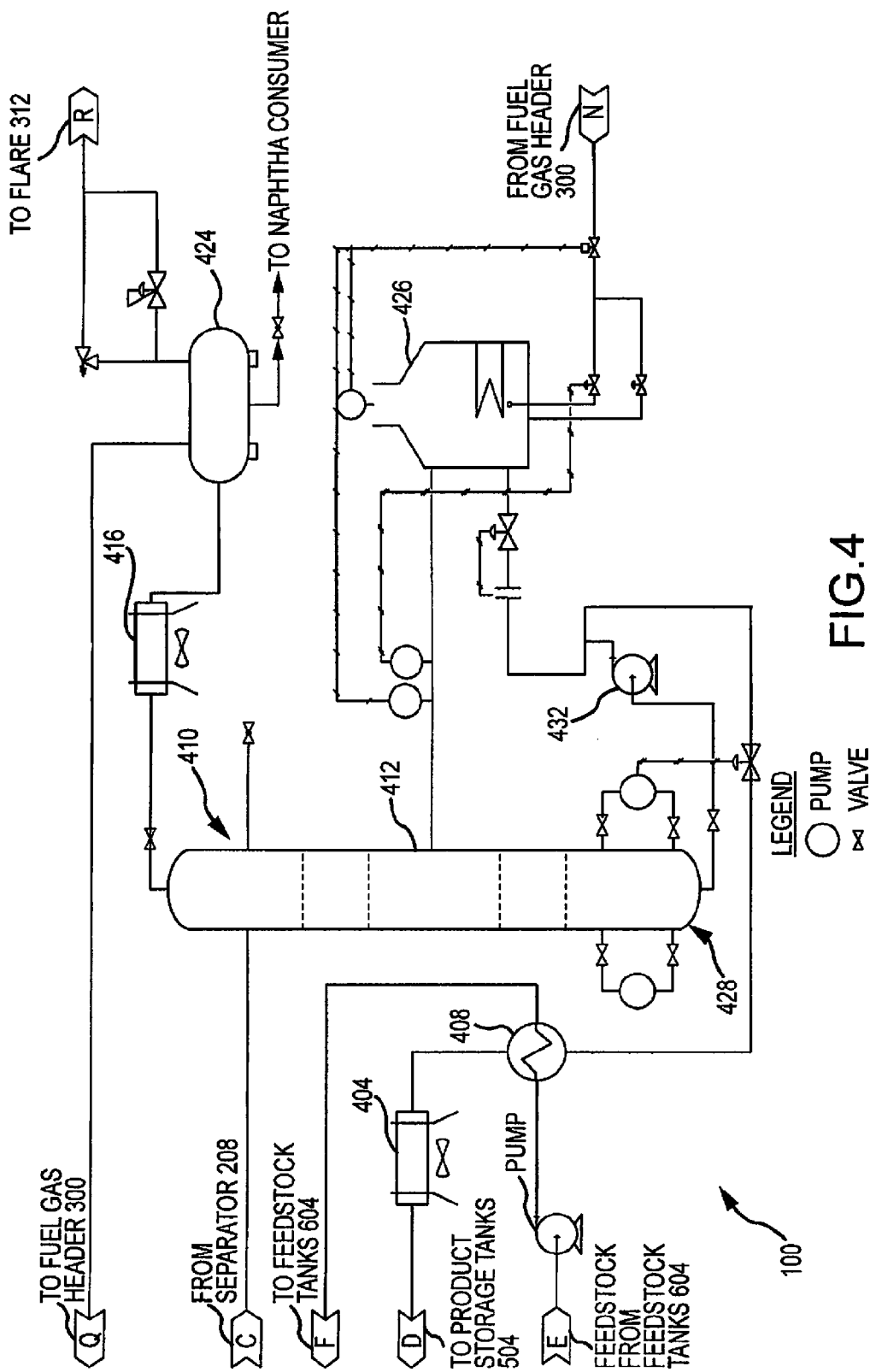
FIG. 4 illustrates an additional portion of the schematic illustrated in FIG. 1A or 1B.
Figure 5:
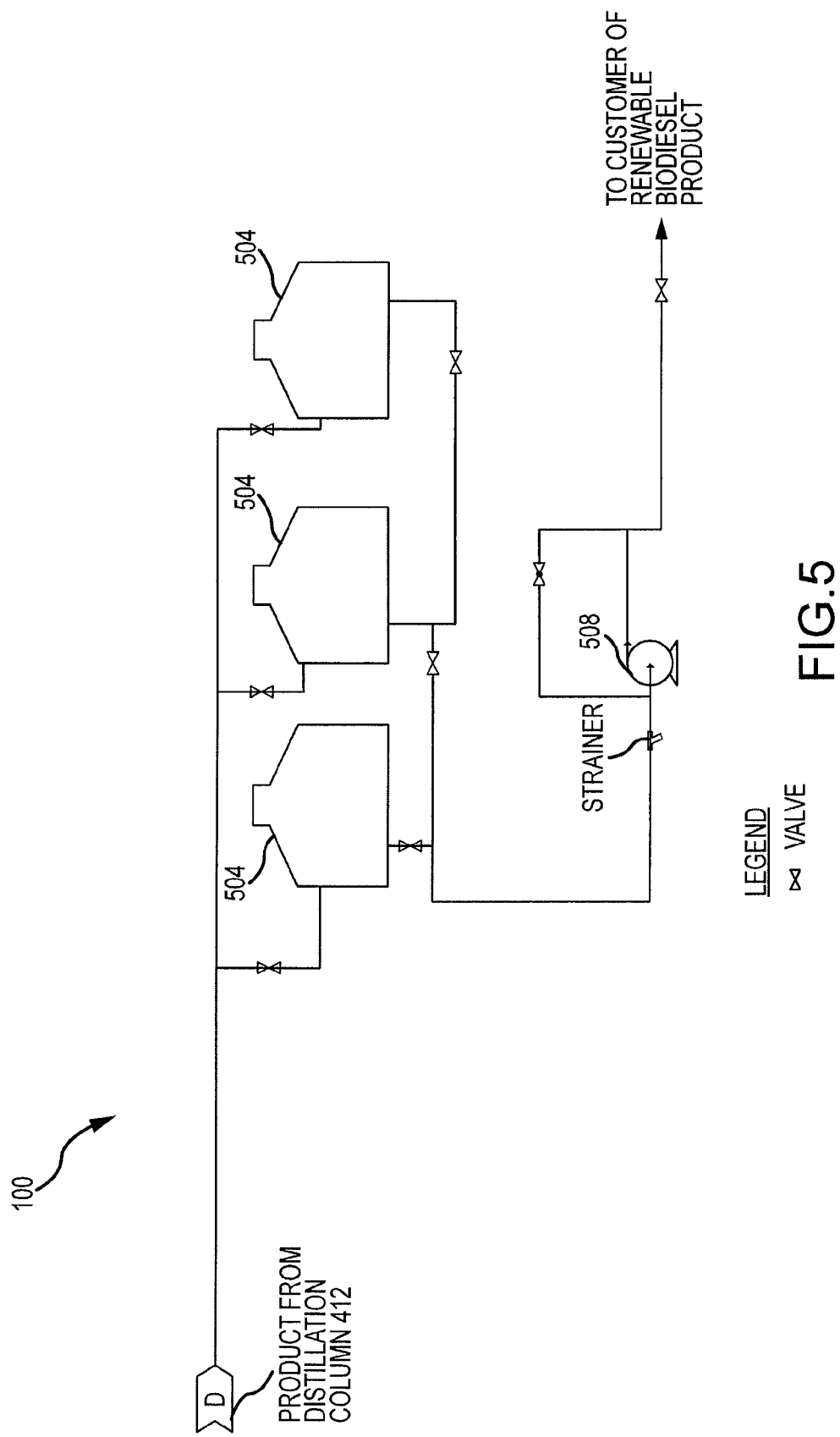
FIG. 5 illustrates an additional portion of the schematic illustrated in FIG. 1A or 1B.

With reference now to FIG. 4, the product stream from the separator 208 is then sent to a distillation column 412. The distillation column 412 may be heated, at least in part, by distillation column heater 426, wherein distillation column heater 426 may be fueled in part by gases recovered from the stripper 208. As the product goes through the reactors 124, some of the molecules crack into smaller molecules, which is why the methane, ethane and propane gases are produced. However, this also makes some of the diesel molecules smaller so they now resemble a naphtha molecule. The distillation column 412 separates the naphtha and any remaining gases that did not get removed in the separator 208 from the diesel fuel. The vapors taken from the top 410 of the distillation column 412 are cooled through another condenser or separator vessel 416 where the naphtha condenses and separates from the gases. Although relatively small, the gases conveyed via fuel gas header 300 may be utilized as fuel in the heaters. The naphtha is sent to redux accumulator or storage tank 424 and may be sold to a refinery to use as a blending component for gasoline. Biodiesel product is obtained from the bottom 428 of the distillation column 412. Using product pump 432, the product is then conveyed to a product cooler 404 and, with reference now to FIG. 5, then to product storage tanks 504 to be held for sale, such as for blending with petroleum diesel. In at least one embodiment, a product distribution pump 508 is used to pump the finished renewable diesel product for distribution, such as to tanker trucks for transportation to a buyer. The product stream from the separator 208 is also sent to diesel recycle tank 612 to be recycled with untreated feedstock. As used herein, "unreacted biofeedstock" means biofeedstock that has not previously been sent through the reactor 124.

In a separate embodiment of the one or more present inventions, algae is used as the feedstock in the above described process. More particularly, oil-producing algae is used as the biofeedstock material and is treated in accordance with methods described herein to produce renewable diesel fuel. The following references are incorporated herein by reference in their entirety: U.S. Pat. App. Pub. Nos. 2007/0137097, 2007/0170091, 2008/0154073, 2008/0160593, 2008/0161614, 2008/0161615, 2008/0173570, 2008/0182298, 2008/0282606, 2009/0082603, 2009/0287029, and 2009/0299112; as well as U.S. Pat. Nos. 4,534,855, 5,183,556, 5,705,722 and 7,232,935; and International Publication No. WO 99/65825.

Figure 7:
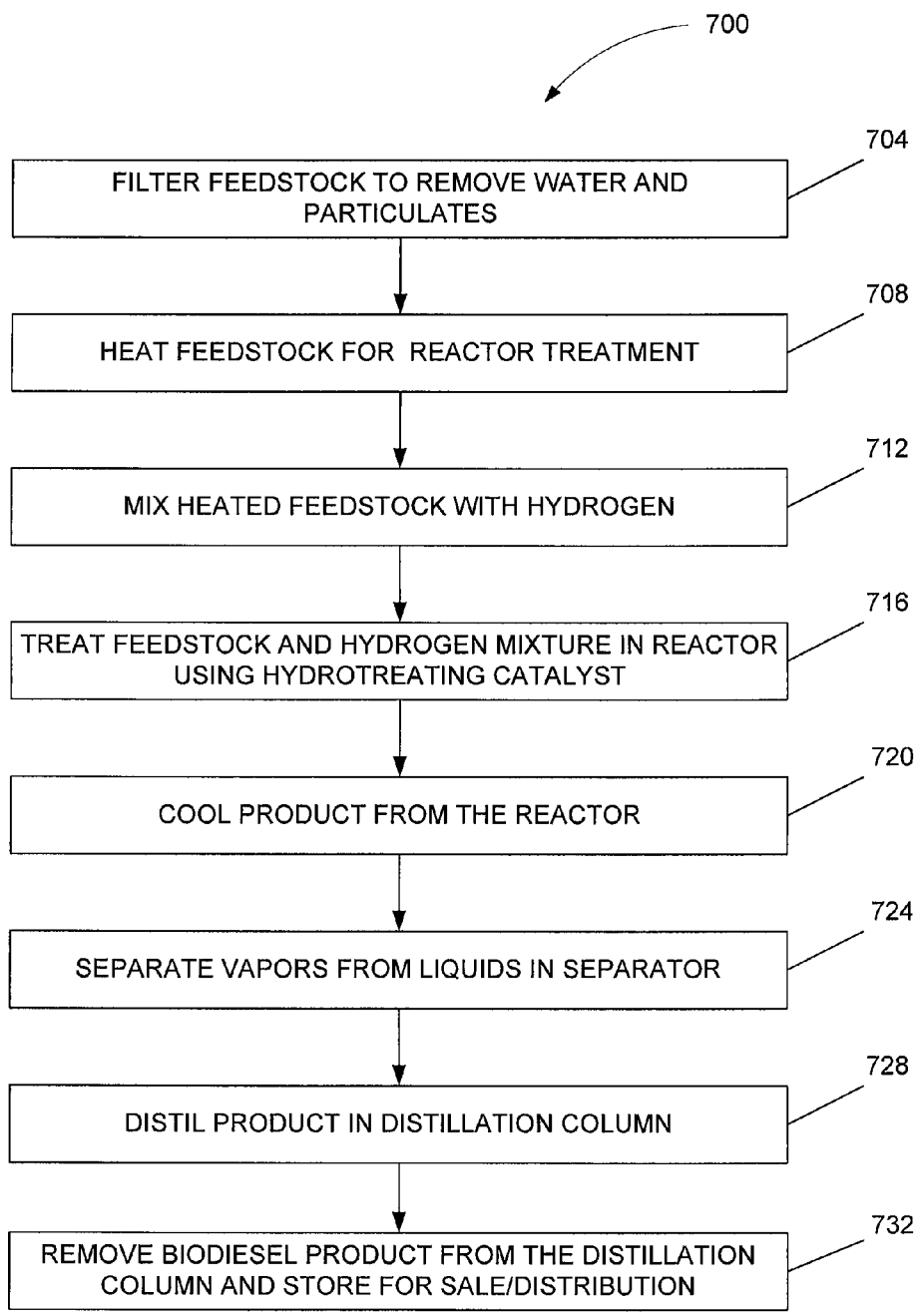
FIG. 7 illustrates a block diagram of method steps of at least one embodiment of the one or more present inventions.

With reference now to FIG. 7, a number of steps involved in a method of generating renewable diesel fuel 700 from biofeedstock are shown in a block diagram for an exemplary embodiment. In step 704, the feedstock is filtered to remove water and particulates. In step 708 the feedstock is heated in advance of treating the feedstock in one or more reactors 124. In step 712 the heated feedstock is mixed with hydrogen. In step 716, the feedstock and hydrogen mixture is treated in a reactor 124 using a hydrotreating catalyst. In step 720, the product is cooled after leaving the reactor 124, and then in step 724 the product is placed in a separator 208 to separate vapors from the liquid product. In step 728, the product sent to a distillation column 412 for being distilled for product purification. Finally, at step 732 the product is removed from the bottom of the distillation column 412 and is then stored for subsequent distribution.

In at least one embodiment, partially processed diesel product is used as part of the biofeedstock at step 704.

In at least one embodiment, at step 708 heat exchanger 108 uses reacted product to heat the biofeedstock entering the reactor 124, and the biofeedstock in turn serves to cool the reacted product leaving the reactor 124 and flowing to the separator 208.

In at least one embodiment, hydrogen is injected into the reactor 124 as part of step 716 to cool the reaction within the reactor 124.

In at least one embodiment, unreacted biofeedstock is used at heat exchanger 408 to assist in cooling purified diesel product leaving the distillation column 412.

Example of System Components

Table 1 provides a listing of system elements used to produce renewable diesel as described herein:

TABLE 1

Example of System Components

| Reference Number | Component |
|---|---|
| 104 | Inlet Charge Pump<br>Rated 200 bpd @ 25 PSID<br>BHP: 5 hp |
| 106 | Coalescing Filter |
| 107 | Feed Pump<br>Rated 200 bpd @ 650 PSID<br>BHP: 7.5 hp |
| 108 | Heat Exchanger<br>Duty: .8332 MMBTU/HR<br>Tubes: 775 psig @ 650 F.<br>Shell: 775 psig @ 480 F. |
| 112 | Inlet Feed Heater<br>Duty: 841 MMBTU/HR<br>Tubes: 775 psig @ 650 F. |
| 124 | Reactor<br>3.0 ft × 60 ft<br>Shell: 700 psig @ 680 F. |
| 126 | Cooler |
| 127 | Separator |
| 204 | Heat Exchanger<br>Duty: 1.108 MMBTU/hr<br>Design Pressure: 775 psig@ 650 F.<br>BHP: 30 hp |
| 208 | Separator<br>3 ft × 13.1 ft<br>Design Pressure: 1440 psig @ 120 F. |
| 216 | Membrane Filter<br>Design Pressure: 700 psig @ 120 F. |
| 304 | Hydrogen Storage Tank<br>Supplied by Praxair |
| 308 | Hydrogen Compressor<br>Capacity: 1.1 MMSCFD<br>BHP: 150 hp (electric) |

TABLE 1-continued

Example of System Components

| Reference Number | Component |
|---|---|
| 312 | Flare |
| | Design Rate: 5 MMSCFD |
| 404 | Product Cooler |
| | Duty: 1.92 MMBTU/Hr |
| | Tube: 150 psig @ 500 F. |
| | BHP: 30 hp |
| 408 | Feed/Bottoms Exchanger |
| | Shell: 300 psig @ 350 F. |
| | Tube: 110 psig @ 500 F. |
| 412 | Distillation Column |
| | 3 ft × 56 ft |
| | Design Pressure: 80 psig @ 780 F. |
| 416 | Separator Vessel |
| | (Stripper OVHD Condenser) |
| | Duty: .37 MMBTU/Hr |
| | Design Pressure: 150 psig @ 350 F. |
| | BHP: 15 hp |
| 424 | Storage Tank (or Reflux Accumulator) |
| | 4 ft × 6 ft |
| | Design Pressure: 150 psig @ 150 F. |
| 426 | Distillation Column Heater |
| | Duty: 1.93 MMBTU/Hr |
| | Tubes: 150 psig @ 705 F. |
| 432 | Product Pump |
| | Rated 300 GPM @ 110 PSID |
| | BHP: 15 hp |
| 504 | Product Storage Tank |
| | Volume: 1000 bbls |
| 508 | Product Distribution Pump |
| | Rated: 200 gpm @ 100 psig |
| | Duty: 30 hp |
| 604 | Feedstock Tank |
| | Volume: 1000 bbls; 500 bbls; 250 bbls |
| 608 | Produced Water Storage Tank |
| | Volume: 250 bbls |
| 612 | Diesel Recycle Tank |
| | Volume: 500 bbls |

Those of skill in the art will appreciate that the example components listed above in Table 1 is but one possible configuration. Accordingly, other types, sizes, capacity, etc. of components may be used and are encompassed by the disclosure and claims herein. In addition, a number of components typically used are not listed, including, but not limited to: piping, fittings, valves, sensors, programmable logic controllers (PLCs), distributed control systems (DCSs), flow meters, etc.

Table 2 provides a summary of fuel characteristics from testing performed on renewable diesel produced from the system shown in Table 1.

TABLE 2

Example of Testing Results on Renewable Biodiesel

| Test | Result | Units | Method |
|---|---|---|---|
| Ash Content | <0.001 | WT % | ASTM D-48 |
| Carbon Residue-Rams, 10% Residue | 0.06 | WT % | ASTM D-524 D86 |
| Cetane Number | 85.2 | | ASTM D-613 |
| Cloud Point | +24 | Deg. F. | ASTM D-2500 |
| Corrosion, Copper Strip | 1A | 3 hrs@122° F. | ASTM D-130 |
| Distillation | | | |
| IBP | 343.8 | Deg. F. | ASTM D-86 |
| 5% Rec | 389.1 | Deg. F. | |
| 10% Rec | 423.8 | Deg. F. | |
| 20% Rec | 462.1 | Deg. F. | |
| 30% Rec | 488.2 | Deg. F. | |
| 40% Rec | 509.9 | Deg. F. | |
| 50% Rec | 528.9 | Deg. F. | |
| 60% Rec | 547.7 | Deg. F. | |
| 70% Rec | 565.9 | Deg. F. | |
| 80% Rec | 587.5 | Deg. F. | |
| 90% Rec | 618.5 | Deg. F. | |
| 95% Rec | 647.7 | Deg. F. | |
| FBP | 666.3 | Deg. F. | |
| Recovery | 97.6 | Vol % | |
| Residue | 1.1 | Vol % | |
| Loss | 1.3 | Vol % | |
| Flash Point | 150 | Deg. F. | ASTM D-93 |
| Kinematic Viscosity | 3.15 | cSt@40° C. | ASTM D-445 |
| Lubricity, HFRR | | | |
| Major Axis | 567 | μm | ASTM D-6079 |
| Minor Axis | 563 | μm | |
| Test Temperature | 60 | Deg. C. | |
| Scar Description | Circle | | |
| WEAR SCAR AVERAGE | 565 | μm | |
| Pour Point | +10 | Deg. F. | ASTM D-97 |
| Sulfur Content | 3.3 | mg/kg | ASTM D-5453 |
| Water & Sediment | 0.02 | Vol % | ASTM D-2709 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing a purified diesel product from a biofeedstock, comprising:
   filtering the biofeedstock;
   heating the biofeedstock;
   introducing hydrogen into the biofeedstock;
   treating the biofeedstock in a reactor to generate a diesel product, the reactor including a hydrotreating catalyst, wherein the treating includes injecting hydrogen into the reactor at multiple locations to cool the diesel product within the reactor;
   cooling the diesel product wherein the diesel product comprises a liquid;
   separating vapors from the liquid; and
   distilling the liquid in a distillation column to generate the purified diesel product.

2. The method of claim 1, further comprising injecting a sulfiding agent into the feedstock after heating the biofeedstock.

3. The method of claim 1, wherein the hydrotreating catalyst comprises an alumina support structure with molybdenum attached to the alumina support structure.

4. The method of claim 1, wherein the heating raises the temperature of the biofeedstock to between about 500 to 540° F.

5. The method of claim 1, wherein the biofeedstock includes at least one of waste grease, tallow, algae, soy oil and vegetable oil.

6. A method of manufacturing, comprising:
   heating a biofeedstock;
   introducing hydrogen into the biofeedstock after said heating the biofeedstock;
   treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, and wherein 331 pounds of topping material, 700 pounds of ring catalyst, and 4800 pounds of 1/10 inch quadrolobe catalyst are associated with the reactor, and wherein additional hydrogen is injected into the reactor to cool the diesel product within the reactor;
   cooling the diesel product after said treating, the cooling causing a separation of gases from the diesel product, wherein the diesel product comprises a liquid; and
   distilling the liquid in a distillation column to generate a purified diesel product.

7. The method of claim 6, wherein the separation of gases generates hydrogen that is recycled back to the reactor.

8. The method of claim 6, further comprising cooling the purified diesel product through a heat exchanger that comprises a conduit containing an unreacted biofeedstock.

9. The method of claim 6, wherein the hydrogen that is injected into the reactor is injected at a plurality of locations along the reactor.

10. The method of claim 6, wherein the biofeedstock includes used cooking oil.

11. The method of claim 6, wherein after said distilling, then repeating said heating, and wherein at least a portion of the biofeedstock comprises an undistilled liquid previously separated from the diesel product before said distilling.

12. The method of claim 11, wherein the undistilled liquid is stored in a storage tank before repeating said heating.

13. The method of claim 6, wherein the heating raises the temperature of the biofeedstock to between about 500 to 540° F.

14. A method of manufacturing approximately 200 bpd of a diesel product from a biofeedstock, comprising:
   heating the biofeedstock;
   introducing hydrogen into the biofeedstock after heating the biofeedstock;
   treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, wherein the reactor contains 331 pounds of a 5/8 inch sized topping material, and wherein additional hydrogen is injected into the reactor to cool the diesel product within the reactor;
   cooling the diesel product after said treating, the cooling causing a separation of gases from the diesel product, wherein the diesel product comprises a liquid; and
   distilling the liquid in a distillation column to generate a purified diesel product.

15. The method of claim 14, wherein the reactor further contains 700 pounds of a 3/16 inch sized ring catalyst and 4800 pounds of a 1/10 inch sized quadrolobe catalyst.

16. The method of claim 15, wherein the 1/10 inch sized quadrolobe is made of straight molybdenum.

17. A method of manufacturing a purified diesel product from a biofeedstock, comprising:
   heating the biofeedstock;
   introducing hydrogen into the biofeedstock;
   treating the biofeedstock in a reactor to generate a diesel product, the reactor including a hydrotreating catalyst, wherein the treating includes injecting hydrogen into the reactor at multiple locations to cool the diesel product within the reactor;
   cooling the diesel product wherein the diesel product comprises a liquid;
   separating vapors from the liquid;
   routing a first portion of the liquid to a storage tank and thereafter routing the first portion of the liquid back to be added with the biofeedstock before heating the biofeedstock; and
   distilling a second portion of the liquid in a distillation column to generate the purified diesel product.

18. The method of claim 17, wherein the hydrogen that is injected into the reactor is injected at a plurality of locations along the reactor.

19. The method of claim 17, wherein the biofeedstock includes at least one of waste grease, tallow, algae, soy oil and vegetable oil.

20. The method of claim 17, further comprising injecting a sulfiding agent into the biofeedstock after heating the biofeedstock.

21. The method of claim 17, wherein the hydrotreating catalyst comprises an alumina support structure with molybdenum attached to the alumina support structure.

22. The method of claim 17, wherein the heating raises the temperature of the biofeedstock to between about 500° F. to about 540° F.

23. A method of manufacturing, comprising:
heating a biofeedstock;
introducing hydrogen into the biofeedstock after said heating the biofeedstock;
treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, and wherein 331 pounds of topping material, 700 pounds of ring catalyst, and 4800 pounds of 1/10 inch quadrolobe catalyst are associated with the reactor, and wherein additional hydrogen is injected into the reactor to cool the diesel product within the reactor;
cooling the diesel product after said treating, the cooling causing a separation of gases from the diesel product, wherein the diesel product comprises a liquid; and
distilling the liquid in a distillation column to generate a purified diesel product;
wherein after said distilling, then repeating said heating, and wherein at least a portion of the biofeedstock comprises an undistilled liquid previously separated from the diesel product before said distilling.

24. The method of claim 23, wherein the separation of gases generates hydrogen that is recycled back to the reactor.

25. The method of claim 23, further comprising cooling the purified diesel product through a heat exchanger that comprises a conduit containing an unreacted biofeedstock.

26. The method of claim 23, wherein the hydrogen that is injected into the reactor is injected at a plurality of locations along the reactor.

27. The method of claim 23, wherein the biofeedstock includes used cooking oil.

28. The method of claim 23, wherein the undistilled liquid is stored in a storage tank before repeating said heating.

29. The method of claim 23, wherein the heating raises the temperature of the biofeedstock to between about 500° F. to about 540° F.

30. A method of manufacturing approximately 200 bpd of a diesel product from a biofeedstock, comprising:
heating the biofeedstock;
introducing hydrogen into the biofeedstock after heating the biofeedstock;
treating the biofeedstock in a reactor to form a diesel product after said introducing hydrogen into the biofeedstock, the reactor including a hydrotreating catalyst for contacting the biofeedstock within the reactor, wherein the hydrotreating catalyst is comprised of an alumina support structure with molybdenum attached to the alumina support structure, wherein the reactor contains 5/8 inch sized topping material, and wherein additional hydrogen is injected into the reactor to cool the diesel product within the reactor;
cooling the diesel product after said treating, the cooling causing a separation of gases from the diesel product, wherein the diesel product comprises a liquid;
routing a first portion of the liquid to a storage tank and thereafter routing the first portion of the liquid back to be added with the biofeedstock before heating the biofeedstock; and
distilling a second portion of the liquid in a distillation column to generate a purified diesel product.

31. The method of claim 30, wherein the reactor further contains 3/16 inch sized ring catalyst and 1/10 inch sized quadrolobe catalyst.

32. The method of claim 31, wherein the 1/10 inch sized quadrolobe is made of straight molybdenum.

* * * * *